United States Patent [19]

Tunoda et al.

[11] Patent Number: 4,960,435
[45] Date of Patent: Oct. 2, 1990

[54] CRYSTALLINE FORM OF ACETAMIDO-AMINO-NITRO-AZO-BENZENE DYE AND A PROCESS FOR PREPARING THE SAME

[75] Inventors: Mituaki Tunoda, Shiraoka; Nobuharu Suzuki, Yono, both of Japan

[73] Assignee: Nippon Kayaku Kabushiki Kaisha, Tokyo, Japan

[21] Appl. No.: 446,136

[22] Filed: Dec. 5, 1989

[30] Foreign Application Priority Data

Dec. 15, 1988 [JP] Japan ................... 63-314910

[51] Int. Cl.$^5$ ............... C09B 67/02; C09B 29/08; D06P 1/18
[52] U.S. Cl. ............................ 8/526; 8/524; 8/532; 8/533; 8/690; 8/922; 534/575
[58] Field of Search ........................... 8/526

[56] References Cited

U.S. PATENT DOCUMENTS

| | | | |
|---|---|---|---|
| 2,007,382 | 7/1935 | Ockmaw | 8/526 |
| 4,319,880 | 3/1982 | Opitz et al. | 8/526 |
| 4,327,999 | 5/1982 | Koller et al. | 8/526 |
| 4,329,144 | 5/1982 | Eugster et al. | 8/526 |
| 4,332,588 | 6/1982 | Eugster et al. | 8/526 |
| 4,374,640 | 2/1983 | Tappe et al. | 8/526 |
| 4,453,944 | 6/1984 | Liechti et al. | 8/526 |
| 4,460,375 | 7/1984 | Sommer et al. | 8/526 |
| 4,722,737 | 2/1988 | Brandt et al. | 8/526 |
| 4,921,505 | 5/1990 | Effenberger et al. | 8/526 |

FOREIGN PATENT DOCUMENTS 49-013479 2/1974 Japan.

Primary Examiner—A. Lionel Clingman
Attorney, Agent, or Firm—Henry C. Nields

[57] ABSTRACT

A crystalline form of the dye represented by the following formula (1):

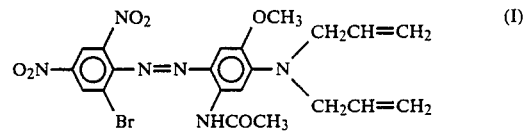

characterized by an X-ray diffraction pattern having a strong peak at the angle of diffraction ($2\theta$) of 23.2° and relatively strong peaks respectively at the angles of diffraction ($2\theta$) of 8.3°, 12.3°, 20.8°, 21.9°, 25.0°, 27.1°, 29.2° and 30.8° according to X-ray powder diffractometry through the use of a Cu-K$\alpha$ line and a process for preparing the same by heat-treating a heat-instable crystalline form of the dye represented by the formula (1) in water, water containing a water-soluble organic solvent, or water containing an anionic or nonionic surfactant at a temperature of 40° C. or above.

It withstands dyeing at high temperature, e.g. 130° C. or higher, to provide dyed fibers having excellent fastness properties.

10 Claims, 2 Drawing Sheets

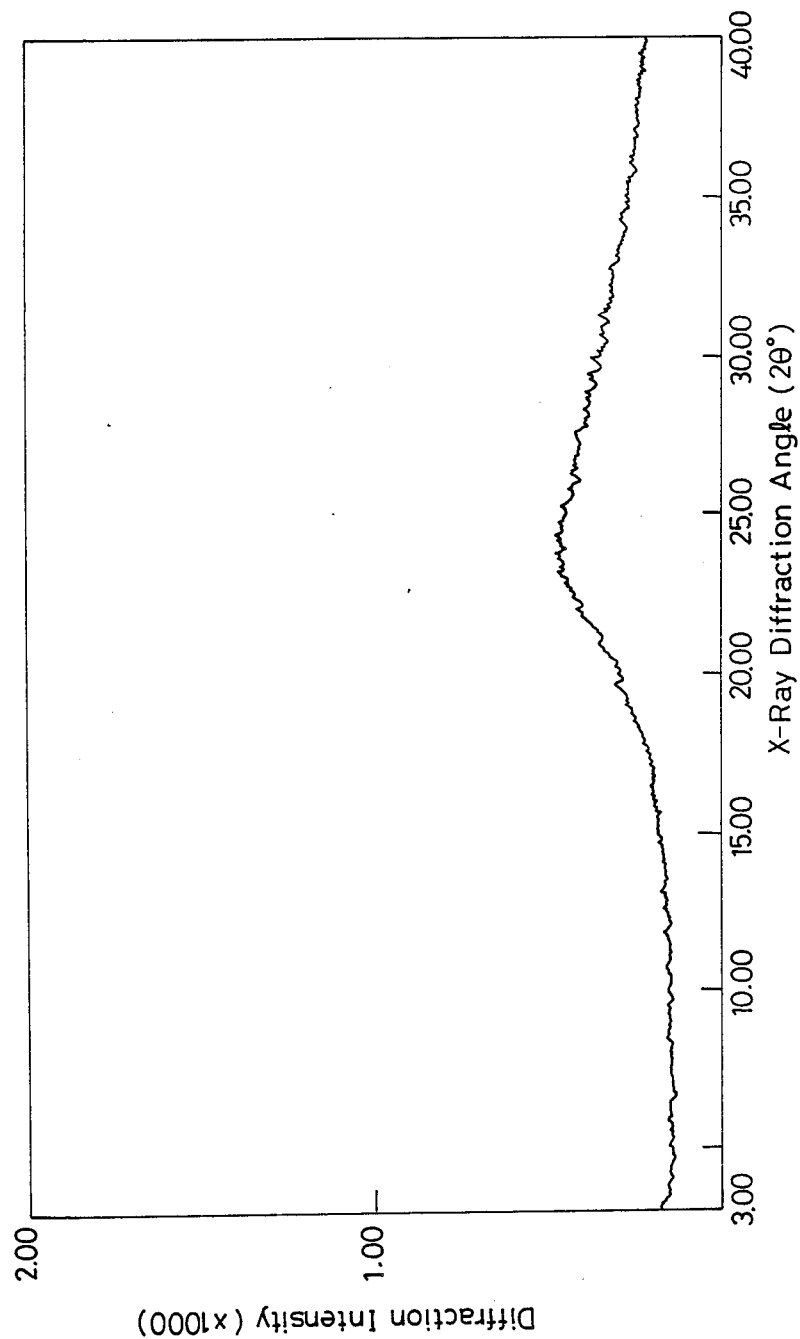

CRYSTALLINE FORM OF ACETAMIDO-AMINO-NITRO-AZO-BENZENE DYE AND A PROCESS FOR PREPARING THE SAME

BACKGROUND OF THE INVENTION

The present invention relates to a heat-stable crystalline form of a dye and a process for preparing the same.

A dye represented by the following formula (1) is known in the art as disclosed in Japanese Patent Laid-Open (KOKAI) No. 49-13479 (1974):

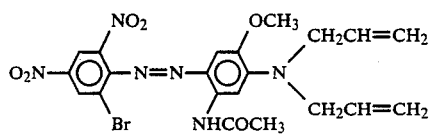

It is known that the dye represented by the formula (1) dyes a synthetic fiber, e.g., a polyethylene terephthalate fiber, navy blue.

In recent years, the rationalization of dyeing operation and energy-saving measures have advanced in the dyeing industry and various attempts have been made in order to reduce the bath ratio and, at the same time, to adopt dyeing methods, such as Obermaier dyeing, cheese dyeing, beam dyeing and jet dyeing, wherein a dye liquor is circulated with the substrate being held in a resting state, so that development of a dye having an excellent dispersion stability at a high temperature has been eagerly desired in the art for the purpose of preventing uneven dyeing caused by a filter effect in dyeing process.

When the dye represented by the formula (1) and produced by an ordinary method is used for dyeing at a high temperature, for example, at a temperature of 95° C. or higher, dispersion of dye particles in a dye bath unfavorably becomes poor, so that it is difficult to obtain a dyed material having a uniform dyeing depth.

The present inventors have made extensive and intensive studies with a view to solving the above-described problem, which has led to the completion of the present invention.

SUMMARY OF THE INVENTION

Specifically, the present invention provides a heat-stable crystalline form of the dye represented by the following formula (1):

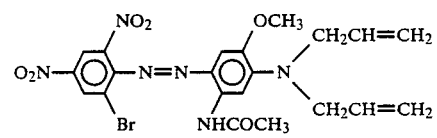

characterized by an X-ray diffraction pattern (cf. FIG. 1) having a strong peak at the angle of diffraction ($2\theta$) of 23.2° and relatively strong peaks respectively at the angles of diffraction ($2\theta$) of 8.3°, 12.3°, 20.8°, 21.9°, 25.0°, 27.°, 29.2° and 30.8° according to X-ray powder diffractometry through the use of a Cu-K$\alpha$ line (this crystalline form will be hereinafter referred to as the "$\beta$-crystal form"), and a process for preparing the same. (An error within a usual range ($\pm 0.2$) for an angle of diffraction is regarded as tolerable.)

BRIEF DESCRIPTION OF THE DRAWINGS:

FIG. 2 is an X-ray diffraction pattern of the heat-instable $\alpha$-crystal form (amorphous). In FIGS. 1 and 2, the abscissa represents an angle of diffraction ($2\theta$), while the ordinate represents the intensity of diffraction.

Figure 1:
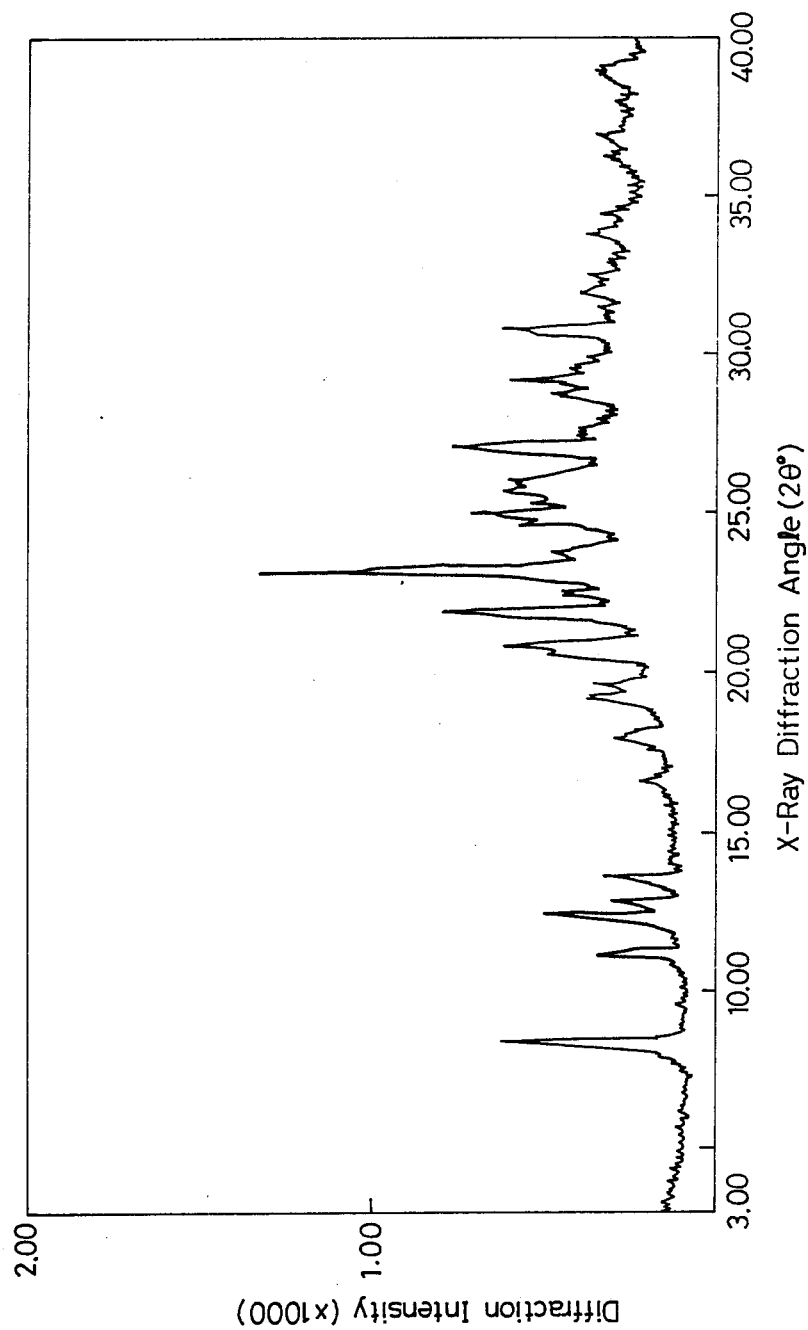
FIG. 1 is an X-ray diffraction pattern of the heat-stable $\beta$-crystal form.

DETAILED DESCRIPTION OF THE INVENTION:

In the present invention, the heat-instable crystalline form of the dye represented by the formula (1), i.e., a crystal form form before conversion into the $\beta$-crystal form (this crystalline form will be hereinafter referred to as the "$\alpha$-crystal form") can be prepared according to a known method which comprises diazotizing 6-bromo-2,4-dinitroaniline and coupling the diazotization product with 3-N,N-diallylamino-4-methoxy-acetanilide in an acid medium. This $\alpha$-crystal form is in the so-called "amorphous form" which exhibits, e.g., a peak having a gentle slope shown in FIG. 2 in a Cu-K$\alpha$ line diffractometry. When the dye in the form of $\alpha$-crystal form is mechanically atomized together with a dispersant, e.g., a sodium salt of formalin condensates of naphthalenesulfonic acid or a sodium salt of ligninsulfonic acid, in a sand mill or the like according to a customary commercialization method and then applied to dyeing of a woven fabric of a polyester fiber or a blended woven fabric comprising a combination of a polyester fiber with an acrylic fiber, cotton or the like, instability of the $\alpha$-crystal form to heat causes formation of a tarry substance or an agglamerate at 95 to 135° C., i.e., a temperature at which a polyester fiber is dyed. The tarry substance and the bulked dye particle hinder uniform dyeing. In particular, in the case of Obermaier dyeing, cheese dyeing, beam dyeing, jet dyeing, etc., the agglomerated particle of the dye is filtered by a fiber layer and becomes causative of clogging, failure of internal penetration, and casing spots, which not only makes it impossible to attain uniform dyeing but also brings about a problem of lowering in the fastnesses of the dyed material.

The present inventors have made studies with a view to eliminating the above-described drawbacks and meeting the demand of the market and, as a result, have found that the $\beta$-crystal form characterized by the above-described X-ray diffraction pattern is very excellent in the dyeing stability at a high temperature, which has led to the completion of the present invention.

The present invention will now be described in more detail.

The $\beta$-crystal form of the dye represented by the formula (1) which is stable in the dyeing at a high temperature can be prepared by heating, in water, water containing a water-soluble organic solvent, or water containing an anionic or nonionic surfactant at a temperature of 40° C. or above, a wet cake or a dried cake of the $\alpha$-crystal form formed through known diazotization followed by coupling.

The water-soluble organic solvent may be added usually in 5 to 50 parts by weight into 100 parts by weight of water, and the surfactant may be added usually in 1 to 50 parts by weight into 100 parts by weight of water.

The above solvent, i.e., water, water containing a water-soluble organic solvent and water containing a surfactant, is usually used in an amount of 5 to 100 parts by weight to one part (on a dry basis) of α-crystal form.

The treating time may be prolonged or shortened according to need. The α-crystal form is converted into the β-crystal form by, e.g., heating at 40 to 200° C., preferably 50 to 100° C. for 1 to 3 hr. Although prolongation of the treating time brings about no problem, it is disadvantageous from the viewpoint of economy.

Examples of the water-soluble organic solvent include lower alcohols such as methanol, ethanol, isopropyl alcohol, and butyl alcohol; ethylene glycol monoalkyl ethers such as methyl Cellosolve, ethyl Cellosolve, and butyl Cellosolve; glycols such as ethylene glycol; ketones such as acetone and methyl ethyl ketone; and cyclic ethers such as tetrahydrofuran and dioxane.

Examples of the anionic surfactant include a salt of formalin condensates of 8-naphthalenesulfonic acid, a salt of formalin condensates of naphthalenesulfonic acid and cresolsulfonic acid and a salt of ligninsulfonic acid, and examples of the nonionic surfactant include sorbitan fatty acid esters, polyoxyethylene sorbitan fatty acid esters, polyoxyethylene alkyl ethers, polyoxyethylene alkylphenols and polyoxyethylene alkylamides. These may be used alone or in a combination of two or more of them.

Conversion of the α-crystal form to the β-crystal form is conducted by a method wherein use is made of either a wet cake of the α-crystal form obtained by filtration and washing after the coupling reaction or a dried cake obtained by drying the wet cake, a method wherein a reaction mixture is heated after adjusting the pH of the reaction mixture of the coupling reaction without conducting filtration, or a method wherein the reaction mixture is heated after the addition of a necessary amount of a water-soluble organic solvent or an anionic or nonionic surfactant and the adjustment of the pH of the resultant mixture.

It is also possible to conduct the conversion of the α-crystal form to the β-crystal form by a method wherein the above-described water-soluble organic solvent or surfactant is added before the coupling reaction and the heat treatment is conducted after the completion of the coupling reaction, as far as this addition has no adverse effect on the coupling reaction.

Whether or not the desired crystal form conversion has been completed can be easily confirmed by X-ray diffraction spectroscopy.

Examples of the fibers which can be dyed with the dye having the β-crystal form of the present invention include a polyethylene terephthalate fiber, and a blended spinning product or a blended woven fabric comprising a combination of a polyethylene terephthalate fiber with a natural fiber such as cotton, silk or wool.

The fiber can be dyed with the dye having a structure represented by the formula (1) and the β-crystal form according to the present invention as follows. In general, a cake of a dye in the form of β-crystal form is minutely dispersed in an aqueous medium in the presence of a dispersant, such as a salt of formalin condensates of naphthalenesulfonic acid, an ester of a higher alcohol with sulfuric acid or a salt of a higher alkylbenzenesulfonic acid, to prepare a dye bath or a printing paste, and dip dyeing or printing treatment can be conducted with the dye bath or printing paste. The dyeing temperature is preferably 80 to 220° C.

In the case of dip dyeing, the dye of the present invention can be applied to, e.g., dyeing processes such as high-temperature dyeing (120 to 140° C.), e.g., Obermaier dyeing, cheese dyeing, beam dyeing, carrier dyeing (80 to 110°) or thermosol dyeing (180 to 220° C.).

In the present invention, it is possible to use the dye represented by the above formula (1) in the form of β-crystal form in combination with other dye. Further, various compounding additives may be added in the step of preparing a disperse dye composition.

[EXAMPLES]

The present invention will now be described in more detail by way of Examples.

EXAMPLE 1

13.1 g of 2,4-dinitro-6-bromoaniline was added to 18.5 g of concentrated sulfuric acid and 16.2 g of 40 wt% nitrosylsulfuric acid, and the mixture was stirred at 50° C.±2° C. for 2 hr to prepare a solution of diazotized 2,4-dinitro-6-bromoaniline.

Separately, 13 g of 3-diallylamino-4- o methoxyacetanilide was dissolved in 110 g of an 8 wt% aqueous sulfuric acid solution, and the mixture was cooled to 0° C. or below. The solution of the diazotized aniline prepared above was added to the cooled mixture to conduct coupling. After the completion of the coupling, the reaction mixture was neutralized with sodium carbonate to attain Congo Red neutrality, filtered, and washed with water to recover 24.7 g (on a dry basis) of a dye cake.

This cake had an X-ray diffraction pattern shown in FIG. 2, i.e., was in the form of α-crystal.

Then, this dye cake was dispersed in 500 ml of water and the dispersion was heat-treated at 70 to 75° C. for 1 hr while stirring. After treatment, a cake was obtained by filtration. The cake was analyzed by X-ray diffractometry. As a result, it was found that the cake was in the form of β-crystal form having an X-ray diffraction pattern as shown in FIG. 1.

EXAMPLE 2

A mixture of 21 g (on a dry basis) of a wet cake of the α-crystal form prepared by the same method as that of Example 1 with 21 g of sodium salt of formalin condensates of naphthalenesulfonic acid, 28 g of sodium salt of formalin condensates of naphthalenesulfonic acid and cresolsulfonic acid, and 300 g of water was heated at 70 to 75° C. for 1 hr. Part of the mixture was filtered, washed with water, and dried in vacuo. The resultant dye crystal had the same X-ray diffraction pattern as that shown in FIG. 1, i.e., was β-crystal form. 3 g of a dye composition prepared by grinding the above-descirbed heat-treated solution with a sand grinder and spray-drying the ground solution was dispersed in 3 liters of water, and the pH of the dispersion was adjusted to 5 with acetic acid and sodium acetate to prepared a dye bath. 100 g of a Tetoron cloth was immersed in the dye bath and dyed at 130° C. for 60 min. The dyed cloth was subjected to soaping, washing with water, and drying. Consequently, a cloth uniformly dyed navy blue was obtained.

EXAMPLE 3

The dye having β-crystal form was prepared by the same treatment as that of Example 2, except that 7.5 g of Rheodol TW-0 (polyoxyethylene sorbitan nonionic surfactant; a product of Kao Atlas Co., Ltd.) was used instead of the surfactants for conversion of crystalline form used in Example 2.

EXAMPLE 4

The dye having β-crystal form was prepared by the same treatment as that of Example 2, except that 30 g of ethylene glycol monomethyl ether was used instead of the surfactants for conversion of crystalline form used in Example 2.

EXAMPLE 5

Coupling was conducted in the same manner as that of Example 1. Then pH of the coupling solution was adjusted to pH$^2$ with 25% aqueous caustic soda solution, and then stirred at 70 to 75° C. for 1 hr. The solution was subjectd to filtration and washing with water to prepare a dye. The crystal of the dye was β-crystal form.

COMPARATIVE TEST 21 g of a dye in the form of α-crystal form or β-crystal form was subjected to wet grinding together with 21 g of sodium salt of formalin condensates of naphthalenesulfonic acid and 28 g of sodium salt of formalin condensates of naphthalenesulfonic acid and cresolsulfonic acid by means of a sand grinder and dried in vacuo to prepare a dispersed dye composition.

Heat agglomeration test (1) and casing spot test (2) were conducted for comparison of the heat stability of each dye composition.

TABLE 1

| Crystal form | Testing method | |
|---|---|---|
| | (1) Heat agglomeration | (2) Casing spot |
| β-crystal form | 5 | 4 |
| α-crystal form | 3 | 3–4 |

Each testing method will now be described in detail.

(1) Heat agglomeration test:

The temperature of a dye bath prepared by dispersing 0.5 g of a dispersed dye composition in 100 ml of water and adjustig the pH value of the dispersion to 4.5 with acetic acid and sodium acetate (without immersion of a fiber: blank bath) was raised from 60° C. to 130° C. over a period of 40 min. The dye bath was maintained at that temperature for 10 min, cooled to 95° C. over a period of 5 min, and subjected to suction filtration with a quantitative filter paper (Toyo filter paper No. 5A). The heat agglomerative property was judged from the amount and state of the residue remaining on the filter paper, and expressed according to the following five ranks: 5th grade (excellent)–1st grade (poor).

(2) Casing spot test:

10 g of a Tetoron jersey was immersed in a dye bath prepared by dispersing 0.6 g of a dispersed dye composition in 180 ml of water and adjusting the pH value of the dispersion to 4.5 with acetic acid and sodium acetate. The temperature was raised from 60° C. to 130° C. over a period of 40 min (with a color pet dyeing machine). The dye bath was maintained at that temperature for 10 min and cooled to 60° C. The casing spot was judged from the state of agglomerates adherent to that part where the substrate was inscribed in a substrate holder and expressed according to the following five ranks: 5th grade (excellent)–1st grade (poor).

What we claim is:

1. A heat-stable β-crystalline form of the dye represented by the following formula (1):

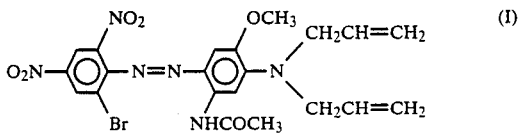

characterized by an X-ray diffraction pattern having a strong peak at the angle of diffraction (2θ) of 23.2° and relatively strong peaks respectively at the angles of diffraction (2θ) of 8.3°, 12.3°, 20.8°, 21.9°, 25.0°, 27.°, 29.2° and 30.8° according to X-ray powder diffractometry through the use of a Cu-Kα line.

2. A process for preparing the crystalline form of the dye according to claim 1, comprising heat-treating heat-unstable amorphous form of the dye represented by the formula (1) described in claim 1 in water, water containing a water-soluble organic solvent, or water containing an anionic or nonionic surfactant at a temperature of 40° C. or above.

3. A process according to claim 2, wherein one part by weight of said heat-unstable amorphous form of the dye is contained in 5 to 100 parts by weight of water, said water containing the water-soluble orgnic solvent or said water containing the surfactant.

4. A process according to claim 2, wherein said water-soluble organic solvent is a member selected from the group consisting of lower alcohols, ethylene glycol monoalkyl ethers, glycols, ketones and cyclic ethers.

5. A process according to claim 2, wherein said anionic surfactant is a member selected from the group consisting of a salt of formalin condensates of β-naphthalenesulfonic acid, a salt of formalin condensates of naphthalenesulfonic acid and cresolsulfonic acid, and a salt of ligninsulfonic acid.

6. A process according to claim 2, wherein said nonionic surfactant is a member selected from the group consisting of sorbitan fatty acid esters, polyoxyethylene sorbitan fatty acid esters, polyoxyethylene alkyl ethers, polyoxyethylene alkylphenols and polyoxyethylene alkylamides.

7. A process according to claim 2, wherein the amount of said water-soluble organic solvent contained is 5 to 50 parts by weight to 100 parts by weight of water.

8. A process according to claim 2, wherein the amount of said surfactant contained is 1 to 50 parts by weight to 100 parts by weight of water.

9. A method for dyeing a fiber, which comprises dispersing the heat-stable β-crystalline form of the dye according to claim 1 in an aqueous medium in the presence of a dispersant to prepare a dye bath or a printing paste, and subjecting said fiber to dyeing or printing treatment with said dye bath or said printing paste at a temperature of 80 to 220° C.

10. A method for dyeing according to claim 9, wherein said dyeing is Obermaier dyeing, package dyeing, beam dyeing, carrier dyeing or thermosol dyeing.

* * * * *

UNITED STATES PATENT AND TRADEMARK OFFICE
CERTIFICATE OF CORRECTION

PATENT NO. : 4,960,435
DATED : October 2, 1990
INVENTOR(S) : Mituaki Tunoda and Nobuharu Suzuki It is certified that error appears in the above-identified patent and that said Letters Patent is hereby corrected as shown below:

Column 1, line 63, before "29.2° and 30.8°" and after "25.0°," delete "27.°," and substitute therefor --27.1°,--

Column 1, line 28, after "such as" and before "dyeing," delete "Obermaier" and substitute therefor --Overmaier--

Column 2, line 37 after "in the case of" delete "Obermaier" and substitute therefor --Overmaier--

Column 3, line 68 through Column 4, line 1 after "(120 to 140° C.), e.g.," delete "Obermaier" and substitute therefor --Overmaier--

Column 6, line 16, after "21.9°, 25.0°," delete "27.°," and substitute therefor --27.1°,--

Column 6, line 63, after "wherein said dyeing is" and before "dyeing, package" delete "Obermaier" and substitute therefor --Overmaier--

Signed and Sealed this

Ninth Day of June, 1992

*Attest:*

DOUGLAS B. COMER

*Attesting Officer*   Acting Commissioner of Patents and Trademarks